(12) United States Patent
Lay

(10) Patent No.: US 6,769,850 B2
(45) Date of Patent: Aug. 3, 2004

(54) SNAP-IN THREADED FASTENER AND STEMMED WASHER ASSEMBLY

(75) Inventor: Alec Lay, Rockford, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 10/232,138

(22) Filed: Aug. 30, 2002

(65) Prior Publication Data

US 2003/0063961 A1 Apr. 3, 2003

Related U.S. Application Data

(60) Provisional application No. 60/324,780, filed on Sep. 25, 2001.

(51) Int. Cl.[7] .......................... F16B 37/04; F16B 39/284
(52) U.S. Cl. ........................ 411/112; 411/108; 411/182; 411/432; 411/999
(58) Field of Search ................................ 411/107, 111, 411/112, 113, 177, 181, 182, 432, 533, 970, 999, 108

(56) References Cited

U.S. PATENT DOCUMENTS

| | | |
|---|---|---|
| 299,969 A | 6/1884 | Fahy |
| 2,151,255 A | 3/1939 | Witchger |
| 2,670,513 A | 3/1954 | Schlueter |
| 3,104,493 A | 9/1963 | Nalle |
| 3,192,823 A | 7/1965 | Munse |
| 3,238,581 A | 3/1966 | Sawyer |
| 3,283,794 A | 11/1966 | Steward et al. |
| 3,373,789 A | 3/1968 | Parkin et al. |
| 3,379,090 A | 4/1968 | Parkin |
| 3,765,078 A | 10/1973 | Gulistan ...................... 29/432 |
| 4,732,519 A * | 3/1988 | Wagner .................. 411/533 X |
| 4,813,835 A | 3/1989 | Toth ........................... 411/429 |
| 4,948,316 A | 8/1990 | Duran et al. ................ 411/353 |
| 4,971,498 A | 11/1990 | Goforthe .................... 411/134 |
| 4,986,712 A * | 1/1991 | Fultz ...................... 411/533 X |
| 5,056,974 A | 10/1991 | Dolin ......................... 411/102 |
| 5,094,579 A * | 3/1992 | Johnson .................. 411/970 X |
| 5,255,647 A * | 10/1993 | Kiczek ................... 411/533 X |
| 5,382,124 A * | 1/1995 | Frattarola ............... 411/970 X |
| 5,611,654 A | 3/1997 | Frattarola et al. ........... 411/432 |
| 5,613,818 A | 3/1997 | McCorkle et al. .......... 411/509 |
| 5,902,084 A | 5/1999 | Garcia ........................ 411/432 |
| 6,162,038 A | 12/2000 | Cefaretti .................... 425/186 |
| 6,309,158 B1 | 10/2001 | Bellinghausen et al. .... 411/353 |

FOREIGN PATENT DOCUMENTS

| | | |
|---|---|---|
| DE | 195 34 389 A1 | 3/1997 |
| FR | 2 699 235 A1 | 12/1992 |

\* cited by examiner

*Primary Examiner*—Neill Wilson
(74) *Attorney, Agent, or Firm*—Mark W. Croll; Paul F. Donovan

(57) ABSTRACT

The present technique provides a stemmed washer and fastener assembly, which has a fastener retained in assembly with a stemmed washer. The assembly is particularly useful for applications in which a standoff is desired between a washer and a mating fastener. The stemmed washer includes a washer portion, a retaining portion, and a standoff portion. The retaining portion interfaces with the fastener, such as with a plastically deformed skirt portion, to retain the fastener in the assembly. The standoff portion has a toolfree mounting structure, such as a snap-fit member, to mount the stemmed washer and fastener assembly to one or more panels, thereby forming a fastener-panel assembly.

20 Claims, 7 Drawing Sheets

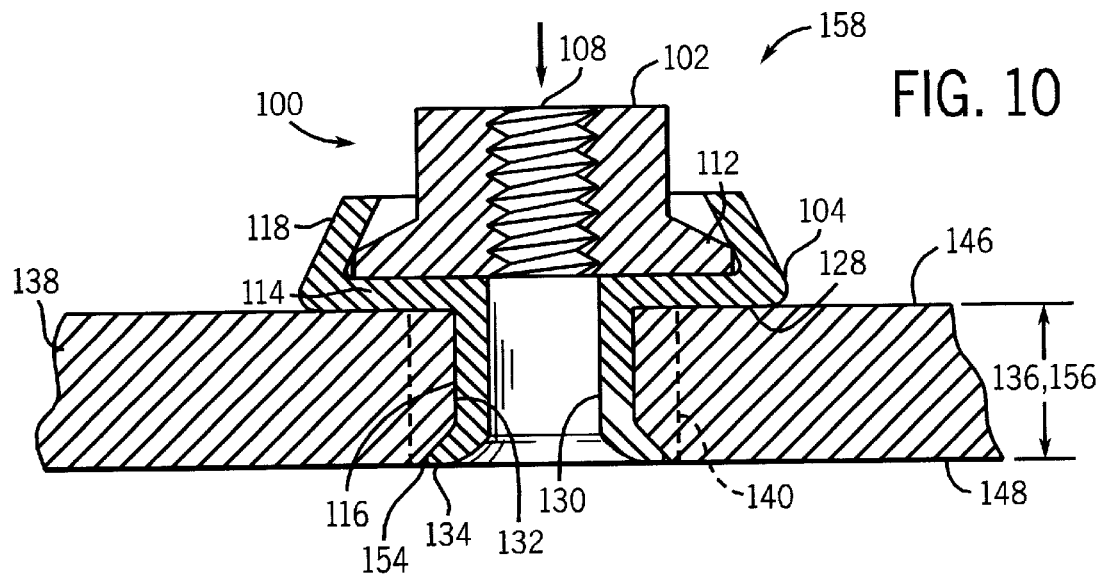
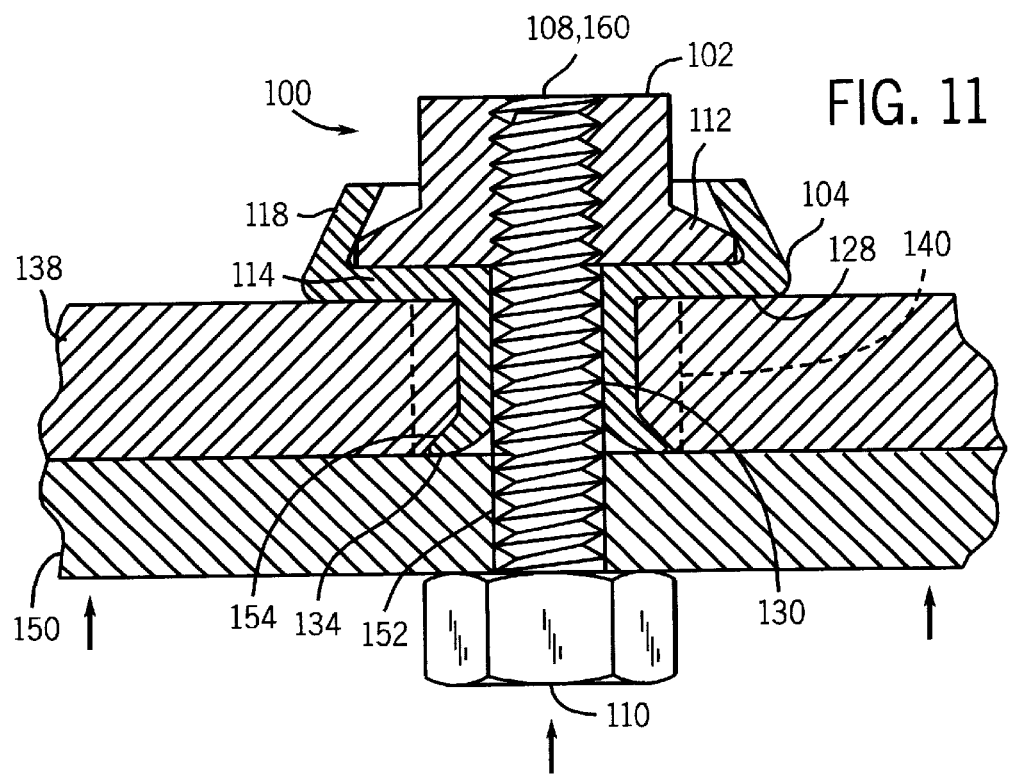

SNAP-IN THREADED FASTENER AND STEMMED WASHER ASSEMBLY

CROSS-REFERENCE TO RELATED APPLICATION

This application claims benefit to U.S. provisional application Serial No. 60/324,780, filed on Sep. 25, 2001.

BACKGROUND OF THE INVENTION

The present technique relates generally to the field of fasteners and, more particularly, to a fastener joined in an assembly with a stemmed washer. The present technique also relates to a system and method for retaining a fastener and such an assembly.

A variety of applications are known for threaded fasteners used with standoffs. In a number of applications wherein one or more compressible materials are to be secured, for example, a standoff is commonly inserted into an aperture in the compressible material, and threaded or other fasteners are placed through the standoff for securing the compressible material in a desired position. Compressible materials on which standoffs are commonly used include various plastics, rubbers, foam materials, and so forth, but may also include expanded metals, cellulosic products, and so forth. Moreover, standoffs are also commonly used in applications wherein penetration of one or more fasteners is to be limited, although the material being fastened in place is not necessarily particularly compressible, such as in fragile or brittle materials.

Where applications call for the use of mechanical standoffs, prior art arrangements have typically relied upon separate components which are brought together in place to permit securing without crushing compressible materials, or while maintaining a desired distance between mechanical components, typically a screw or bolt and a nut. Thus, in a traditional assembly, a standoff is placed in the receiving aperture, a screw or bolt is passed through the aperture and standoff, and a traditional washer and nut are secured on the opposite side. While such arrangements provide generally adequate resistance to crushing and maintain desired mechanical distances between the joined fasteners, they require several separate parts and can entail considerable assembly time for insertion of the standoff, and assembly of the fasteners. Moreover, the various separate parts must be individually manufactured, shipped, stored and brought together in the final assembly.

Accordingly, a need exists for a stemmed washer and fastener assembly, which has a fastener captured by a stemmed washer. A technique is also needed for mounting the stemmed washer in assembly with one or more structures or panels.

SUMMARY OF THE INVENTION

The present technique provides a stemmed washer and fastener assembly, which has a fastener retained in assembly with a stemmed washer. The assembly is particularly useful for applications in which a standoff is desired between a washer and a mating fastener. The stemmed washer includes a washer portion, a retaining portion, and a standoff portion. The retaining portion interfaces with the fastener, such as with a plastically deformed skirt portion, to retain the fastener in the assembly. The standoff portion has a toolfree mounting structure, such as a snap-fit member, to mount the stemmed washer and fastener assembly to one or more panels, thereby forming a fastener-panel assembly.

BRIEF DESCRIPTION OF THE DRAWINGS

The foregoing and other advantages and features of the invention will become apparent upon reading the following detailed description and upon reference to the drawings in which:

FIG. 10 is a cross-sectional side view illustrating the stemmed washer and fastener assembly removably mounted to a panel via the toolfree mounting structure;

FIG. 11 is a cross-sectional side view illustrating the stemmed washer and fastener assembly assembled with the plurality of panels and the mating fastener illustrated in FIG. 9.

DETAILED DESCRIPTION OF SPECIFIC EMBODIMENTS

Figure 1:
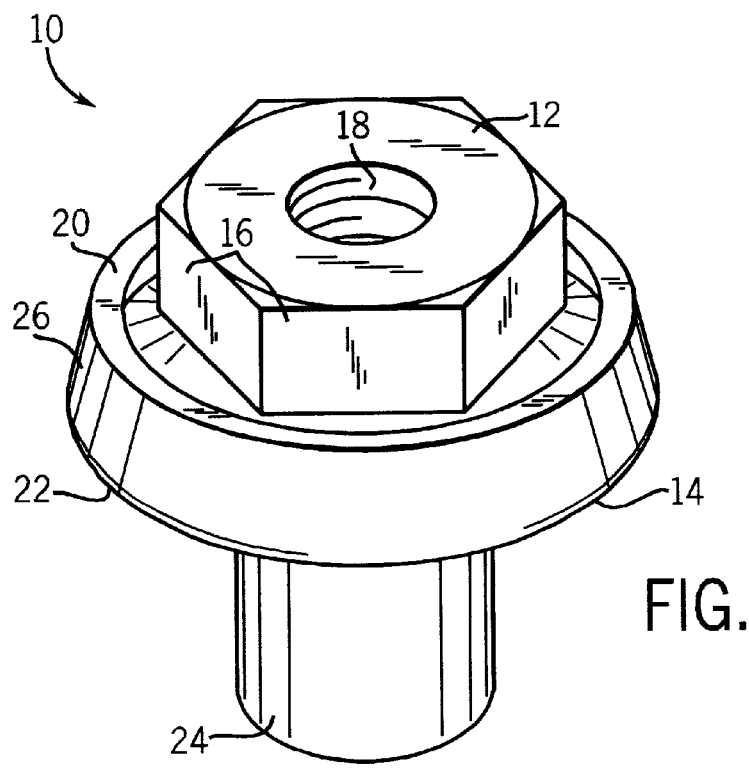
FIG. 1 is a perspective view of a fastener and stemmed washer assembly in accordance with certain aspects of the present technique.

Turning now to the drawings and referring first to FIG. 1, an assembly is illustrated in accordance with the present technique and designated generally by reference numeral 10. The assembly includes an internally threaded fastener 12 secured to a stemmed washer 14. In the illustrated embodiment the fastener 12 is a hex nut having hex flats 16 for interfacing with a conventional wrench. Internal threads 18 are provided for interfacing with a mating threaded fastener as described in greater detail below. A peripheral flange 20 is formed around a base of fastener 12 to interface with a corresponding portion of the stemmed washer to maintain the fastener in the assembly and to permit free spinning of the fastener for securement in an application.

The stemmed washer 14 includes features which serve both as a conventional washer, as a standoff, and as a retaining structure for the fastener 12. In the illustrated embodiment, the stemmed washer 14 thus includes a generally planar washer portion 22 integrally formed with a standoff portion 24. Standoff portion 24 is generally right cylindrical in shape in the illustrated embodiment, although other overall shapes (e.g., tapered) may be employed. Moreover, the shape and contour of the washer portion 22 may be adapted for various purposes, and may deviate from the planar shape illustrated. The retaining portion 26 extends upwardly from the washer portion 22 and extends inwardly slightly over the flange 20 of the fastener to retain the fastener within the assembly. In a present embodiment, the retaining portion 26 fits loosely around the flange 26 to permit free spinning movement of the fastener within the assembly.

Figure 2:
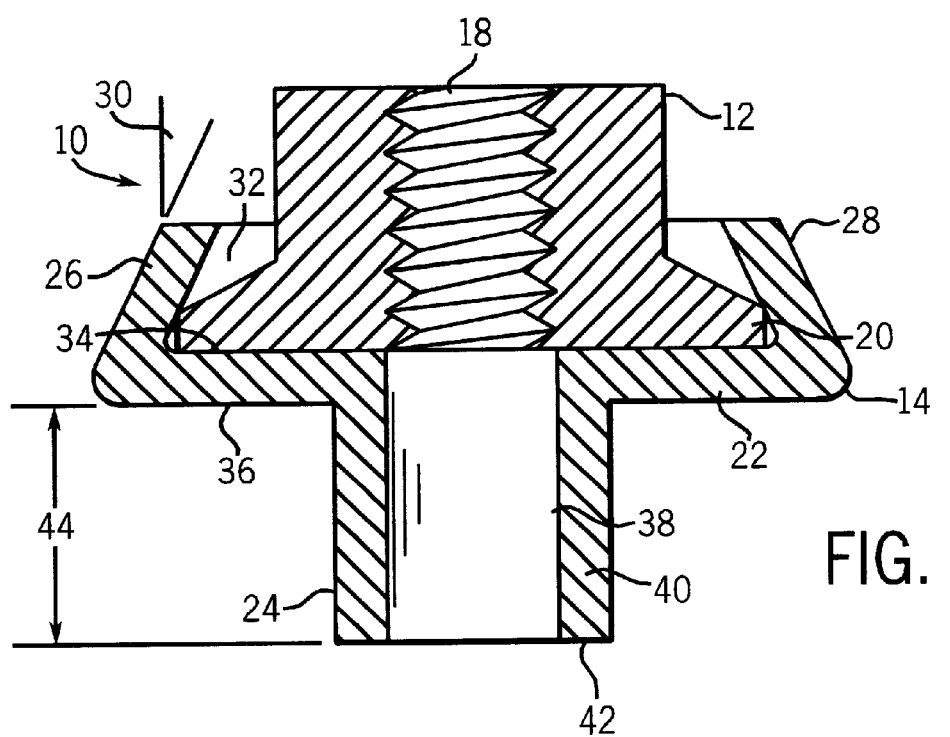
FIG. 2 is a sectional view through the assembly of FIG. 1 illustrating an exemplary configuration of the internally threaded fastener and stemmed washer.

Referring to FIG. 2, the assembly of FIG. 1 is illustrated in cross-section. As noted above, the assembly 10 includes a fastener 12 and a stemmed washer 14. The stemmed washer includes a washer portion 22, a lower standoff portion 24, and a retaining portion 26. In the illustrated embodiment, the retaining portion 26 generally forms an upstanding skirt 28 bent inwardly towards the fastener 12 so as to retain the fastener by interference with the flange 20 provided at the lower extremity of the fastener. While the upstanding skirt 28 may have any suitable shape and contour, in the illustrated embodiment the skirt is angled inwardly slightly through an angle 30 to form a cavity 32 in which the fastener is retained. The fastener thus rests upon a base 34 of the cavity 32 and exerts force against the base when drawn into engagement with a mating fastener. The washer portion 22 presents an abutment surface 36 at its lower face opposite the base 34 for contacting an element to be secured in place. Below the abutment surface 36, the standoff portion 34 has an aperture 38 extending therethrough for receiving a mating fastener as described below. Aperture 38 is surrounded by side walls 40, which as noted above, may be straight cylindrical in shape as illustrated, or may be contoured, flared, or otherwise bent or ridged. A lower abutment end 42 of the standoff portion 24 serves to contact a mating surface, such as of a mating fastener as described below.

Various lengths of the standoff portion 24 may be provided, as illustrated at reference numeral 44 in FIG. 2. In the illustrated embodiment, the dimension 44 extends between the abutment surface 36 and the abutment end 42, thereby defining a final dimension between which elements to be secured in place are disposed. Thus, the length of dimensions 44 will generally correspond to a desired distance between an upper location of an element to be secured in place, and a lower location of a mating component, such as a fastener.

Figure 3:
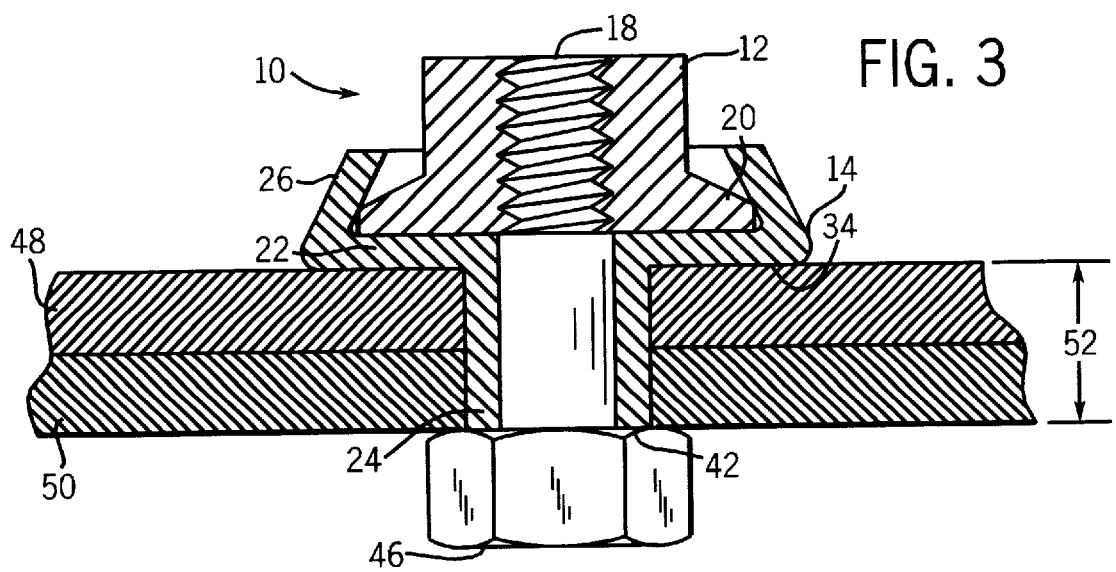
FIG. 3 is a sectional view of the assembly illustrated in FIGS. 1 and 2, installed with a mating fastener to maintain elements in the desired location within a final assembly.

The assembly of FIGS. 1 and 2 is illustrated in an application in FIG. 3. As shown in FIG. 3, the assembly 10 is designed to cooperate with a mating fastener 46, such as a screw or bolt, which is received within the internally threaded fastener 12 of the assembly. In practice, the assembly 10 may be simply inserted into apertures formed within elements to be secured to one another, such as element 48 and element 50 in the illustrated embodiment of FIG. 3, and the mating fastener 46 inserted from an opposite side. The fastener 46, and/or the fastener 12 may then be rotated to join the assembly 10 to the fastener 46, with the elements 48 and 50 lodged therebetween. In the illustrated embodiment the fastener 12 is free to rotate within assembly 10 as described above. In certain applications, however, the fastener may be fixed with respect to the retaining stemmed washer, such that only fastener 46 is rotated for securement.

The final assembly presents a spacing or dimension 52 between the abutment surface 36 and abutment end 42 of the stemmed washer 14. In general, the dimension 52 will be equivalent to dimension 44 illustrated in FIG. 2. It should be noted that the final dimension may provide for loose attachment of the elements to one another, or slight crushing or compression of one or both elements. The arrangement is thus particularly well suited to fastening components which may be damaged or deformed in use, such as plastics, rubbers, expanded metals, and so forth. The arrangement is also particularly well suited to fastening components for which dimensions should be maintained or over-pressure should be avoided, such as metal, glass, and other harder and dimensionally stable components.

Figure 4:
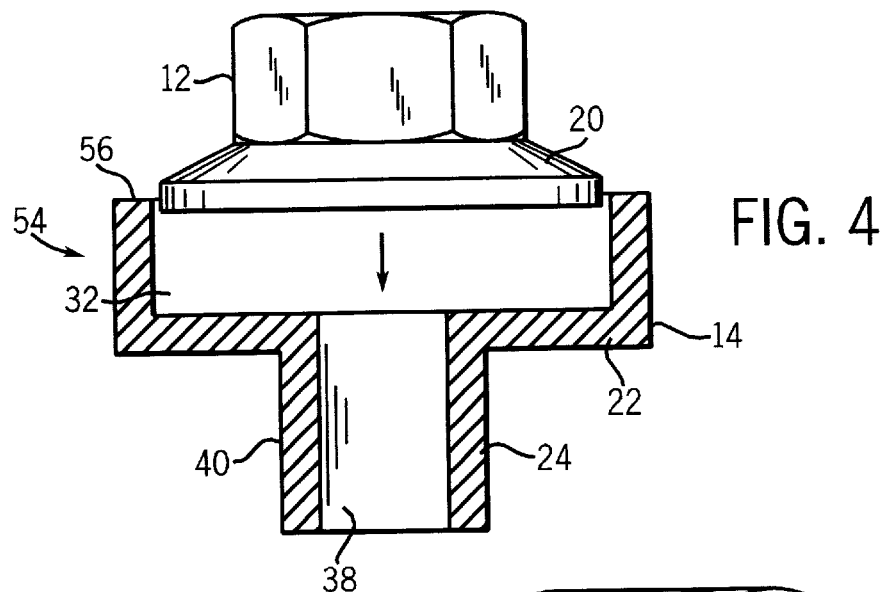
FIGS. 4 and 5 are sectional views of the assembly of FIGS. 1 and 2 showing steps in progressive manufacture of the assembly for retaining the threaded fastener within the stemmed washer.
Figure 5:
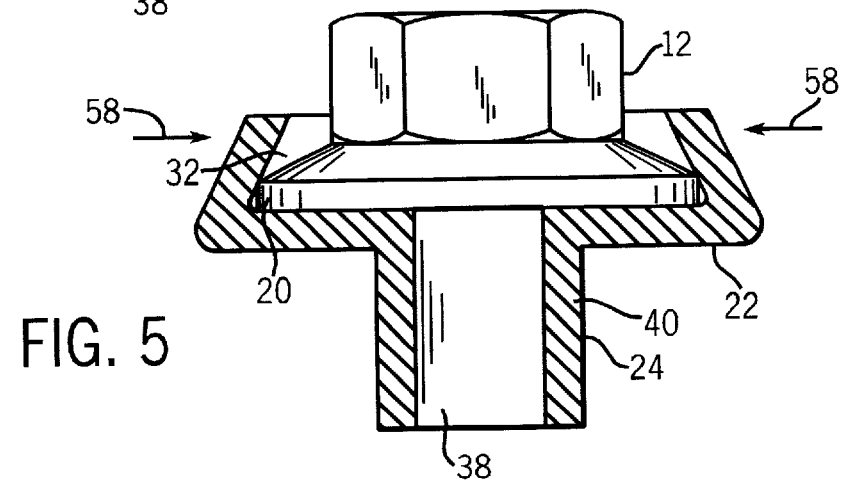

FIGS. 4 and 5 illustrate progressive manufacturing assembly of the elements described above. In a present embodiment, the stemmed washer 14 is formed, such as by a drawing or stamping operation, to form a blank 54. The blank 54 presents the standoff portion 24 and integral washer portion 22, with the washer portion 22 presenting a generally upstanding open skirt 54 defining cavity 32. The internally threaded fastener 12 is then placed within the cavity 32 as illustrated in FIG. 4. With the fastener thus in place, the open skirt 56 of FIG. 4 is bent inwardly, such as in a crimping operation, as illustrated by arrows 58 in FIG. 5. As noted above, while this operation may secure the fastener rigidly within the assembly to prevent rotation, in a presently preferred configuration, the fastener 12 may freely spin within the cavity 32 to allow securement to a mating fastener, while the stemmed washer remains stationary.

Figure 6:
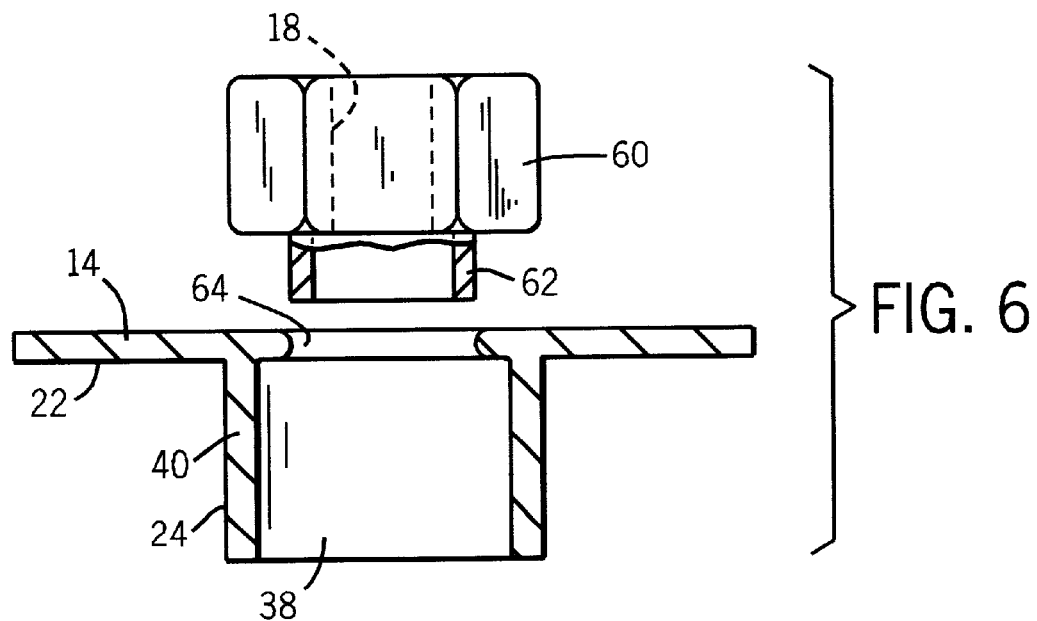
FIGS. 6 and 7 illustrate in partial section an alternative configuration of a threaded fastener secured to a stemmed washer in accordance with aspects of the present technique.
Figure 7:
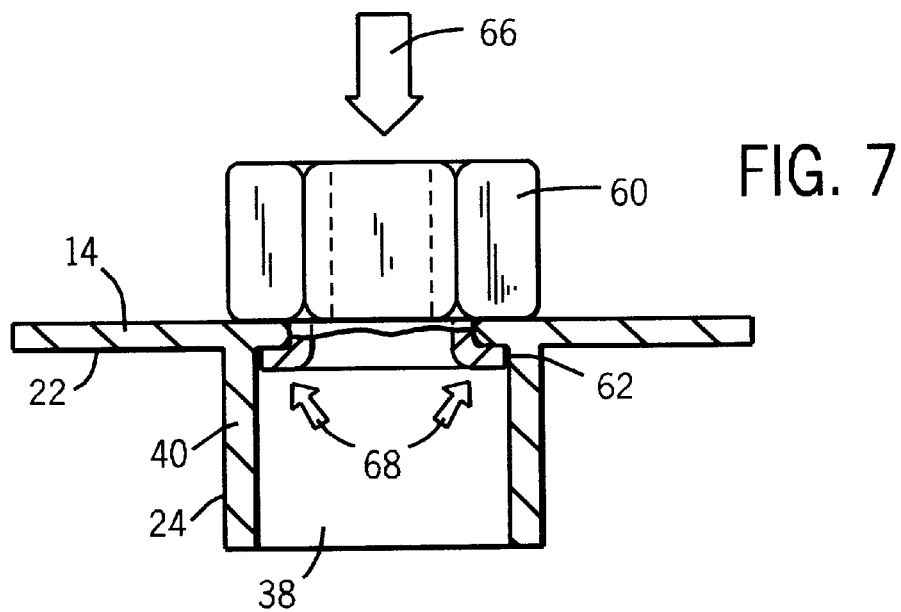

FIGS. 6 and 7 illustrate an alternative configuration of an internally threaded fastener secured to a stemmed washer. In the embodiment of FIGS. 6 and 7, an alternative threaded fastener 60 includes internal thread 18 as in the previous embodiments, but further includes a lower skirt or extension 62. Skirt 62 may be formed by any suitable process, such as during the initial fabrication of the fastener. Extension 62 forms a generally cylindrical skirt extending downwardly from the threaded fastener. Various configurations for the skirt may be envisaged. For example, the skirt may be continuous, extending in an uninterrupted cylinder around the base of the fastener, or may be discontinuous, forming tabs or individual extension feet around the fastener. The stemmed washer 14 in this embodiment includes a radially-projecting internal ridge 64 designed and dimensioned to receive the skirt 62 of the fastener.

As the assembly is brought together, as illustrated in FIG. 7, the internally threaded fastener 60 is lowered into the aperture formed by the ridge 64, as illustrated by arrow 66. The skirt is then deformed plastically, such as through a crimping or flaring operation, to secure the skirt within the stemmed washer. In the illustrated embodiment, skirt 62 is deformed so as to provide for free rotation of the fastener within the stemmed washer. Alternatively, the deforming operation performed on the skirt may be such as to fixedly secure the nut with relation to the stemmed washer to prevent their mutual rotation.

Figure 8:
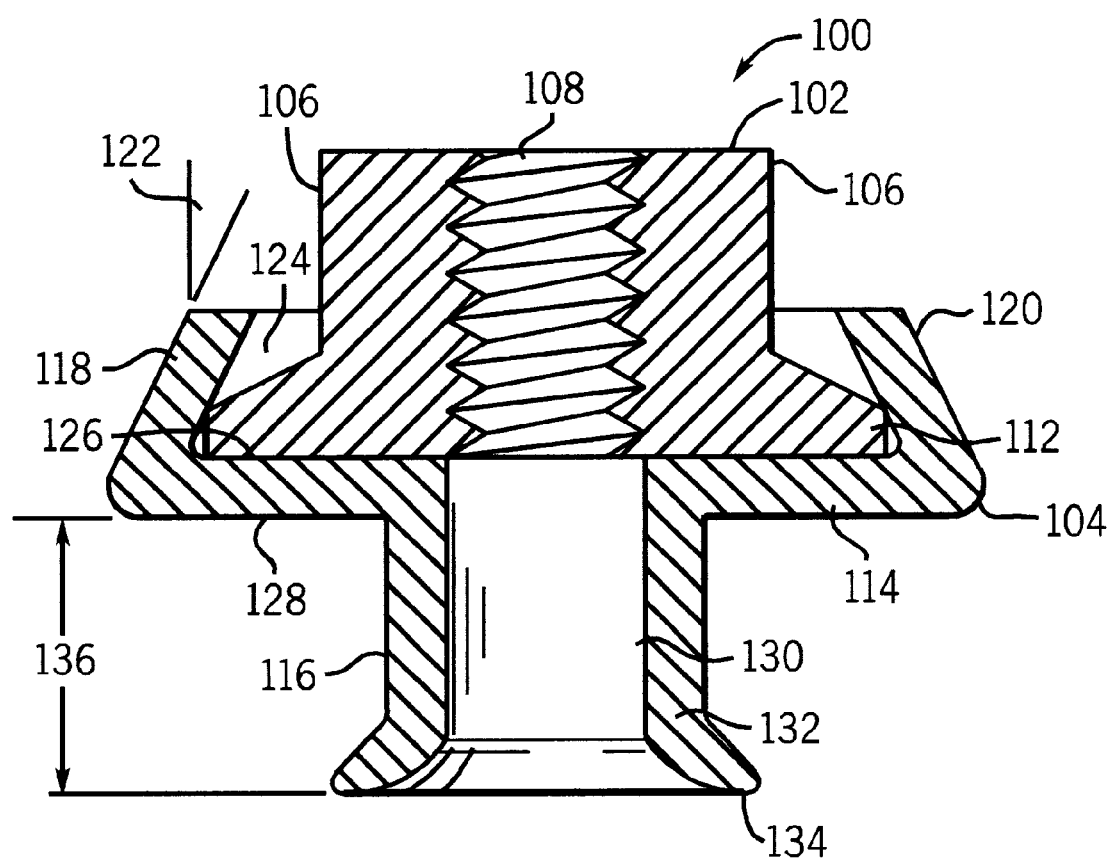
FIG. 8 is a cross-sectional side view of an alternative stemmed washer and fastener assembly having a toolfree mounting structure.

FIGS. 8–11 illustrate an alternative stemmed washer and fastener assembly 100, which is configured for toolfree coupling with one or more panels. FIG. 8 is a cross-sectional side view of the assembly 100, which includes a fastener 102 captured by a stemmed washer 104. In the illustrated embodiment, the fastener 102 is an internally threaded fastener, such as a hex nut having hex flats 106 for interfacing with a conventional wrench. The illustrated fastener 102 also has internal threads 108 for interfacing with a mating fastener 110, as described below with reference to FIGS. 9–11. A peripheral flange 112 extends around a base of fastener 102 to interface with a corresponding portion of the stemmed washer 104 to maintain the fastener 102 in the assembly and to permit free spinning of the fastener 102 for securement in an application.

The stemmed washer 104 includes features that serve both as a conventional washer, as a standoff, and as a retaining structure for the fastener 102 and the assembly 100.

Accordingly, the illustrated stemmed washer 104 includes a washer portion 114, a standoff portion 116, and a retaining portion 118. The illustrated portions 114, 116, and 118 are integrally formed into a uniform structure, which serves both to capture the fastener 102 and to mount the assembly 100 to one or more panels. It should be noted that each of the foregoing portions 114, 116, and 118 may have a variety of geometries and structural configurations adapted for a particular application. For example, the standoff portion 116 may have a generally right cylindrical shape, a square tubular shape, a tapered geometry, or any other geometrical configuration suitable for a particular application. Moreover, the washer portion 114 may have a variety of shapes and contours depending on the particular application.

As illustrated in FIG. 8, the retaining portion 118 has a skirt 120 that extends upwardly from the washer portion 114 and extends inwardly slightly over the flange 20 of the fastener 102 to retain the fastener 102 within the assembly 100. In one embodiment, the retaining portion 118 fits loosely around the flange 112 to permit free spinning movement of the fastener 102 within the assembly 100. The skirt 120 may have any suitable shape and contour to retain the fastener 102. However, the illustrated skirt 120 is angled inwardly slightly through an angle 122 to form a cavity 124 for retaining the fastener 102. The fastener 102 rests on a base 126 of the cavity 124 and exerts force against the base 126 when drawn into engagement with the mating fastener 110 (see FIG. 11). The washer portion 114 presents an abutment surface 128 at its lower face opposite the base 126 for contacting an element to be secured in place. Below the abutment surface 128, the standoff portion 126 has an aperture 130 extending therethrough for receiving the mating fastener 110 (see FIG. 11). Aperture 130 is surrounded by side walls 132, which may have any suitable geometry as described above.

In this exemplary embodiment, the stemmed washer 104 has a lower securement end 134, or toolfree mounting structure, extending outwardly from the standoff portion 116 to secure the standoff portion 116 within a mounting receptacle for the assembly 100. The illustrated securement end 134 has a flared shape extending around the entire circumference of the standoff portion 116. However, the lower securement end 134 may comprise one or more integral or separate ridges, flared structures, tabs, bumps, stakes, spikes, radially deformed structures (i.e., inward or outward), annular or disk-shaped structures, or any other suitable structure protruding outwardly from the standoff portion 116. Moreover, the lower securement end 134 may be configured for snap-fitting the standoff portion 116 to any mating snap-fit structure, such as one requiring direct insertion, rotation, or a combination of motions. Accordingly, the lower securement end 134 facilitates toolfree (e.g., snap-fit) engagement and retainment of the standoff portion 116 with one or more panels. The standoff portion 116 also may have any suitable length 136 to accommodate removable coupling with one or more panels.

Figure 9:
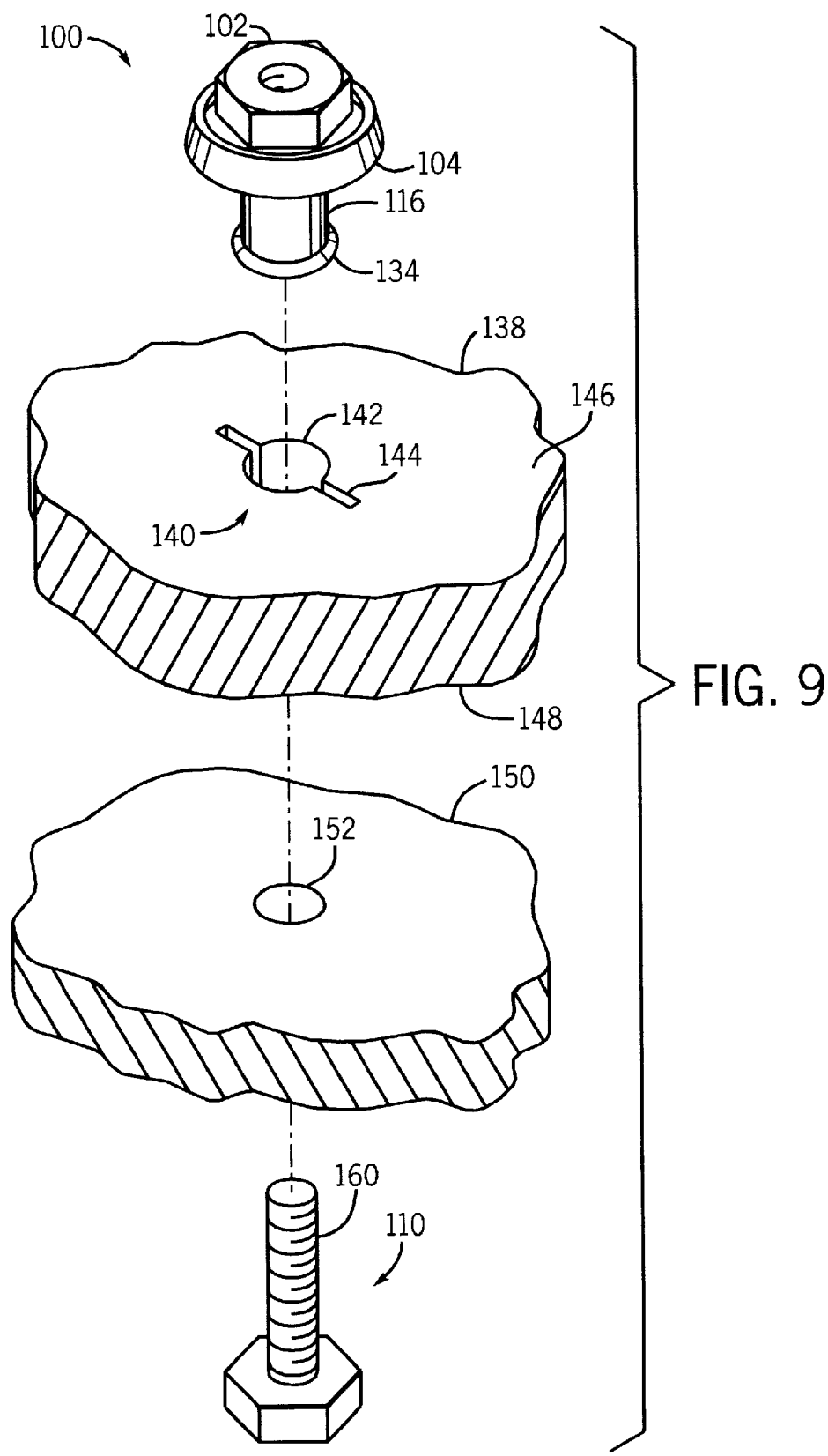
FIG. 9 is a perspective view illustrating the stemmed washer and fastener assembly exploded from a plurality of panels and a mating fastener.

FIG. 9 is a perspective view illustrating the assembly 100 exploded from a plurality of panels and the mating fastener 110. In this exemplary embodiment, the standoff portion 116 is insertable into a panel 138 via a slotted receptacle 140, which has a central passageway 142 that is retractably expandable via one or more slots 144 extending outwardly from the central passageway 142. The panel 138 may be plastic, rubber, foam, or any other suitable material capable of expansion and retraction. In operation, the slotted receptacle 140 expands to accommodate the lower securement end 134 as the standoff portion 116 is inserted between opposite sides 146 and 148 of the panel 138. The slotted receptacle 140 subsequently retracts around the standoff portion 116 after the lower securement end 134 passes through the central passageway 142 to the opposite side 148. Alternatively, the lower securement end 134 may have one or more tab structures, which pass through the slots 144 without expansion and then rotate to a secured position upon insertion through the slotted receptacle 140. Any other toolfree or snap-fit mechanism is also within the scope of the present technique. In any configuration, the lower securement end 134 removably retains the standoff portion 116 and the assembly 100 in toolfree connection (e.g., snap-fitted) with the panel 138. The panel 138 and snap-fitted assembly 100 are then coupleable with a panel 150 or other suitable member via the mating fastener 110, which may be extended through a fastener receptacle 152 of the panel 150. The foregoing panels 138 and 148 may embody a variety of removable or fixed structures. For example, the panel 138 may be a removable panel for an electrical-mechanical device, such as a power tool, while the panel 150 may be a main body panel of the device having the mating fastener 110 extending therefrom.

FIG. 10 is a cross-sectional side view illustrating the assembly 100 in toolfree connection (e.g., snap-fitted) with the panel 138. As illustrated, the slotted receptacle 140 closes onto the side walls 132 of the standoff portion 116 after passing the lower securement end 134 through the slotted receptacle 140. At the opposite side 148, the slotted receptacle 140 may have a recess 154 for the lower securement end 134 to align the lower securement end 134 flush with the opposite side 148. In this exemplary embodiment, the standoff length 136 is equal to the thickness 156 of the panel 138. Alternatively, the panel 150 may have a recess to accommodate the lower securement end 134. In either configuration, the assembly 100 is removably coupled to the panel 138 to form a fastener-panel assembly 158, such that the fastener 102 may be engaged by the mating fastener 110 to secure the panel 138 to the panel 150. An exemplary application of the fastener-panel assembly 158 is a removable guard panel for a machine, such as a motor, a gear box, or a power tool such as a chainsaw.

FIG. 11 is a cross-sectional side view illustrating assembly of the panels 138 and 150 via the assembly 100 and the mating fastener 110. As illustrated, the fastener-panel assembly 158 is disposed adjacent the panel 150 and the fastener 102 is engaged with the mating fastener 110, such that the panels 138 and 150 may be removably secured to one another. In this exemplary embodiment, the mating fastener 110 is an externally threaded fastener, such as a screw or bolt, which has an externally threaded shaft 160 that is rotatably engageable with the internal threads 108 of the fastener 102. The mating fastener 110 also may have a tool engageable head, such as a hex head, to facilitate rotation of the mating fastener 110 relative to the fastener 102. Although the illustrated fasteners 102 and 110 are free to rotate during assembly, the present technique may rotatably fix one of the fasteners 102 and 110. For example, the mating fastener 110 may be fixed to the panel 150, such that only fastener 102 is rotated to secure the fasteners 102 and 110 to one another.

Figure 12:
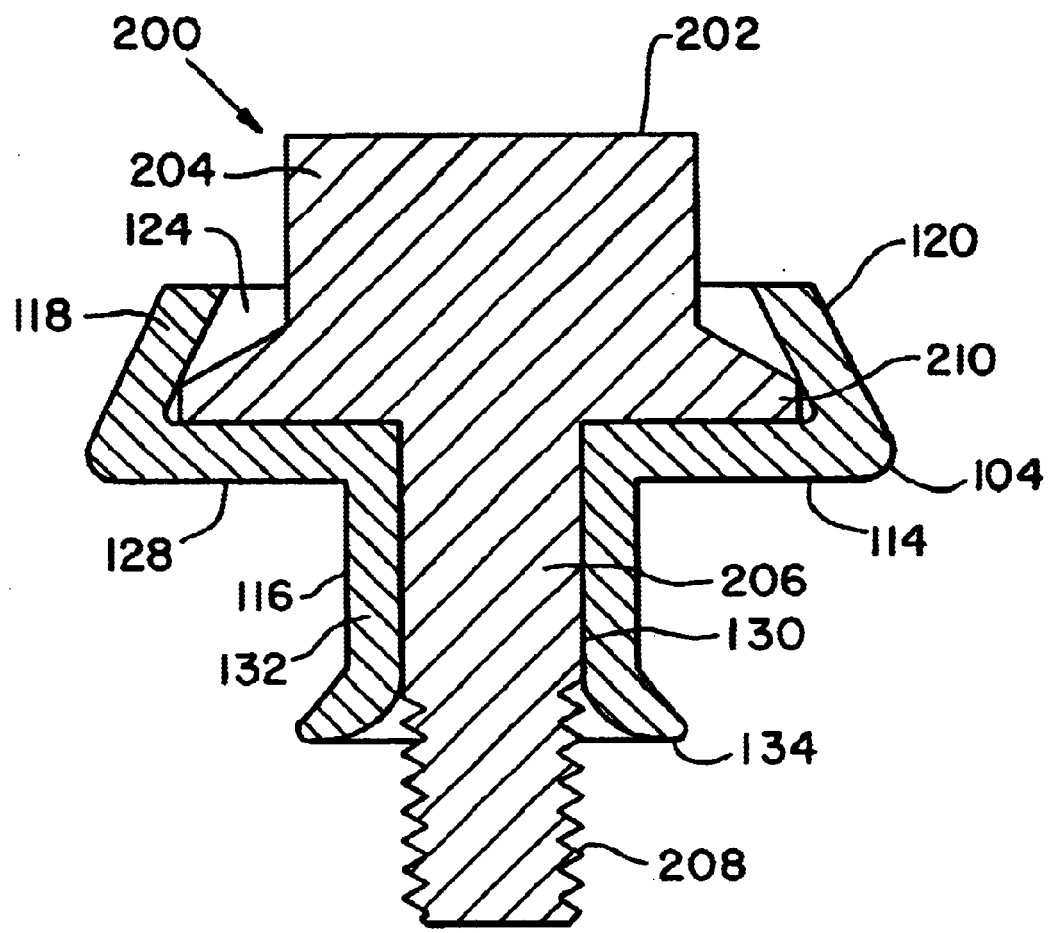
FIG. 12 is a cross-sectional side view of an alternative stemmed washer and fastener assembly having a toolfree mounting structure.

FIG. 12 is a cross-sectional view similar to that of FIG. 8, and illustrates an assembly 200 in which components similar to those of assembly 100 are indicated with the same reference numerals as in FIG. 8. Instead of the internally threaded fastener 102 shown in FIG. 8, assembly 200 of FIG. 12 includes a threaded fastener 202 in the nature of a bolt or screw having a head 204 and a shank 206. External threads 208 are provided on shank 206, and may extend the length of shank 206 or less than the entire length of shank 206. Head 204 includes a flange 210 held in retaining portion 118. Head 204 can include a slot or cavity (not shown) for engaging a screwdriver or other implement, or can include hex flats for engagement by a wrench.

What is claimed is:

1. A threaded fastener assembly, comprising:
   a threaded fastener; and
   a stemmed washer comprising:
      a retaining portion capturing the threaded fastener;
      a washer portion abutting the fastener;
      a standoff portion extending from the washer portion; and
      a snap-fit mounting structure extending from the standoff portion.

2. The threaded fastener assembly of claim 1, wherein the threaded fastener comprises internal threads.

3. The threaded fastener assembly of claim 1, wherein the threaded fastener comprises external threads.

4. The threaded fastener assembly of claim 1, wherein the stemmed washer is an integral structure.

5. A threaded fastener assembly comprising:
   a stemmed washer comprising:
      a retaining portion capturing the threaded fastener;
      a washer portion;
      a stendoff portion extending from the washer portion; and a snap-fit mounting structure extending from the standoff portion;
   wherein the threaded fastener comprises a peripheral flange and the retaining portion extends radially inwardly to capture the peripheral flange.

6. A threaded fastener assembly comprising: wherein the threaded fastener is rotatable relative to the stemmed washer.

7. The threaded fastener assembly of claim 1, wherein the snap-fit mounting structure comprises an annular ridge.

8. The threaded fastener assembly comprising:
   a threaded fastener; and
   a stemmed washer comprising:
      a retaining portion capturing the threaded fastener;
      a washer portion abutting the fastener;
      a standoff portion extending from the washer portion; and
      a snap-fit mounting structure extending from the standoff portion.
   wherein the snap-fit mounting structure comprises an outwardly flared end of the standoff portion.

9. A threaded fastener assembly, comprising:
   an internally threaded fastener; and
   a stemmed washer comprising:
      a retaining portion rotatably capturing the threaded fastener;
      a washer portion adjacent the retaining portion;
      a standoff portion extending from the washer portion; and
      a toolfree mounting structure extending from the standoff portion.

10. The threaded fastener assembly of claim 9, wherein the retaining portion extends integrally from the washer portion.

11. The threaded fastener assembly of claim 9, wherein the toolfree mounting structure extends integrally from the standoff portion.

12. The threaded fastener assembly of claim 9, wherein the retaining portion comprises an annular skirt.

13. The threaded fastener assembly of claim 9, wherein the toolfree mounting structure comprises at least one snap-fit structure.

14. The threaded fastener assembly of claim 9, wherein the toolfree mounting structure comprises at least one radially protruding structure catchable in a receptacle adapted to receive the stemmed washer.

15. A fastening system, comprising:
   a panel having a receptacle; and
   a fastening assembly mountable in the receptacle, comprising:
      a threaded fastener; and
      a stemmed washer, comprising:
         a retaining portion capturing the threaded fastener;
         a washer portion;
         a standoff portion extending from the washer portion; and
         a snap-fit mounting structure extending from the standoff portion.

16. The fastening system of claim 15, wherein the receptacle is expandable to dimensions of the snap-fit mounting structure and the receptacle is retractable to dimensions of the standoff portion.

17. The fastening system of claim 15, wherein the stemmed washer is an integral structure.

18. The fastening system of claim 15, wherein the threaded fastener is rotatable relative to the stemmed washer.

19. The fastening system of claim 15, wherein the snap-fit mounting structure comprises a radially deformed section of the standoff portion.

20. The fastening system of claim 15, wherein the snap-fit mounting structure comprises at least one protruding member.

* * * * *